US012692414B2

(12) United States Patent
Mae

(10) Patent No.: US 12,692,414 B2
(45) Date of Patent: Jul. 28, 2026

(54) POLISHING COMPOSITION, PRODUCTION METHOD OF POLISHING COMPOSITION, POLISHING METHOD, AND MANUFACTURING METHOD OF SEMICONDUCTOR SUBSTRATE

(71) Applicant: FUJIMI INCORPORATED, Aichi (JP)

(72) Inventor: Ryota Mae, Aichi (JP)

(73) Assignee: FUJIMI INCORPORATED, Aichi (JP)

( * ) Notice: Subject to any disclaimer, the term of this patent is extended or adjusted under 35 U.S.C. 154(b) by 426 days.

(21) Appl. No.: 18/370,486

(22) Filed: Sep. 20, 2023

(65) Prior Publication Data

US 2024/0101866 A1     Mar. 28, 2024

(30) Foreign Application Priority Data

Sep. 28, 2022     (JP) ................................. 2022-155096

(51) Int. Cl.
    C09G 1/02          (2006.01)

(52) U.S. Cl.
    CPC ...................................... C09G 1/02 (2013.01)

(58) Field of Classification Search
None
See application file for complete search history.

(56) References Cited

U.S. PATENT DOCUMENTS

| | | | |
|---|---|---|---|
| 2010/0167547 A1* | 7/2010 | Kamimura | ............ H10P 52/403 438/693 |
| 2012/0003901 A1* | 1/2012 | Hu | ........................... C09G 1/02 451/36 |
| 2020/0071567 A1 | 3/2020 | Shinoda et al. | |

FOREIGN PATENT DOCUMENTS

JP          2020-37669 A      3/2020

* cited by examiner

*Primary Examiner* — Roberts P Culbert
(74) *Attorney, Agent, or Firm* — KATTEN MUCHIN ROSENMAN LLP

(57)          ABSTRACT

A polishing composition capable of increasing a polishing selectivity ratio of SiOC to silicon nitride, a production method of the polishing composition, a polishing method, and a manufacturing method of a semiconductor substrate are provided.
The polishing composition contains abrasives having a zeta potential of −5 mV or less, a cationic surfactant, a phosphonic acid-based chelating agent, and a cationic compound having a molecular weight of 300 or less.

20 Claims, No Drawings

POLISHING COMPOSITION, PRODUCTION METHOD OF POLISHING COMPOSITION, POLISHING METHOD, AND MANUFACTURING METHOD OF SEMICONDUCTOR SUBSTRATE

TECHNICAL FIELD

The present invention relates to a polishing composition, a production method of the polishing composition, a polishing method, and a manufacturing method of a semiconductor substrate.

BACKGROUND ART

In recent years, along with multilayer wiring on the surface of a semiconductor substrate, a so-called chemical mechanical polishing (CMP) art has been utilized to polish and planarize the semiconductor substrate when manufacturing semiconductor devices. CMP is a planarization method of the surface of an object to be polished (target to be polished) such as a semiconductor substrate by using a polishing composition (slurry) containing: abrasives such as silica, alumina, and ceria; an anticorrosive; a surfactant; and the like. The object to be polished (target to be polished) is silicon, polysilicon, silicon oxide, silicon nitride, wiring made of metals and the like, plugs, and the like.

Various proposals have been made so far regarding a polishing composition used when polishing semiconductor substrates by CMP. For example, PTL 1 discloses a "polishing composition used for polishing an object to be polished including a silicon oxide film, in which the polishing composition contains abrasives, a compound having a logarithmic value of a partition coefficient (Log P) of 1.0 or more, and a dispersion medium, and has a pH of less than 7.

CITATION LIST

Patent Literature

PTL 1: JP 2020-37669 A

SUMMARY OF INVENTION

Technical Problem

There is a case of polishing a SiOC film formed on a silicon nitride film. Regarding the polishing removal rate of the SiOC film with respect to the polishing removal rate of the silicon nitride film (that is, a polishing selectivity ratio of SiOC to silicon nitride), the user's demand was not necessarily satisfied by conventional polishing compositions. It is desired to improve the polishing selectivity ratio of SiOC to silicon nitride.

The present invention has been made in view of such circumstances, and an object of the present invention is to provide a polishing composition capable of increasing a polishing selectivity ratio of SiOC to silicon nitride, a production method of the polishing composition, a polishing method, and a manufacturing method of a semiconductor substrate.

Solution to Problem

The inventors of the present invention made intensive studies in view of the above-mentioned object. As a result, the inventors of the present invention found that a polishing selectivity ratio of SiOC to silicon nitride is increased by using a polishing composition containing abrasives having a zeta potential of −5 mV or less, a cationic surfactant, a phosphonic acid-based chelating agent, and a cationic compound having a molecular weight of 300 or less, thereby completing the invention.

Advantageous Effects of Invention

According to the present invention, it is possible to provide a polishing composition capable of increasing (improving) a polishing selectivity ratio of SiOC to silicon nitride, a production method of the polishing composition, a polishing method, and a manufacturing method of a semiconductor substrate.

DESCRIPTION OF EMBODIMENTS

Embodiments of the present invention will be described in detail. A polishing composition according to the embodiment of the present invention (hereinafter, the present embodiment) is a polishing composition containing abrasives having a zeta potential of −5 mV or less, a cationic surfactant, a phosphonic acid-based chelating agent, and a cationic compound having a molecular weight of 300 or less.

This polishing composition may be applied for the application of polishing objects to be polished such as elemental silicon, a silicon compound, and a metal, for example, for the application of polishing the surface containing elemental silicon, polysilicon, a silicon compound, a metal, and the like, which are semiconductor substrates in a manufacturing process of a semiconductor device, and is suitable for the application of polishing the surface containing SiOC. For example, the polishing composition is suitable for the application of polishing a SiOC film formed on a silicon nitride film. When polishing is performed using this polishing composition, there is a case in which the surface containing SiOC or a SiOC film formed on a silicon nitride film can be polished with a high selectivity. Hereinafter, the polishing composition according to the present embodiment will be described in detail.

<Abrasives>

The polishing composition according to the present embodiment contains abrasives having a zeta potential of −5 mV or less. The abrasives having a zeta potential of −5 mV or less may be anion-modified silica (for example, silica having the surface on which an organic acid is immobilized). The silica may be colloidal silica. In other words, the abrasives may be anion-modified colloidal silica.

(Zeta Potential)

The abrasives used in the polishing composition according to the present embodiment have a pH of 6 or less, and show a zeta potential of preferably −5 mV or less, more preferably −8 mV or less, and particularly preferably −11 mV or less. In addition, the abrasives used in the polishing composition according to the present embodiment have a pH of 6 or less, and show a zeta potential of preferably −20 mV or more, more preferably −18 mV or more, and particularly preferably −15 mV or more. Since the abrasives (for example, colloidal silica) have the zeta potential in such a range, the polishing selectivity ratio of SiOC to silicon nitride can be further increased (further improved).

As an example, the zeta potential of the abrasives is −5 mV or less and −20 mV or more in the polishing composition according to the present embodiment.

The zeta potential of the abrasives in the polishing composition is calculated by subjecting the polishing composition to ELS-Z2 manufactured by Otsuka Electronics Co., Ltd. to measure using a flow cell at a measurement temperature of 25° C. by a laser Doppler method (electrophoretic light scattering measurement method), and analyzing the obtained data by the Smoluchowski equation.

(Production Method)

Examples of production methods of colloidal silica include a sodium silicate method and a sol-gel method, and colloidal silica produced by any of the production methods is suitably used as the colloidal silica of the present invention. However, colloidal silica produced by the sol-gel method is preferable from the viewpoint of reducing metal impurities. The colloidal silica produced by the sol-gel method is preferable because the content of diffusible metal impurities and corrosive ions such as chloride ions in a semiconductor is small. The production of the colloidal silica by the sol-gel method can be performed by using a conventionally known method. Specifically, the colloidal silica can be obtained by performing a hydrolysis-condensation reaction using a hydrolyzable silicon compound (for example, alkoxysilane or derivatives thereof) as a raw material.

(Surface Modification)

The type of colloidal silica to be used is not particularly limited, but for example, surface-modified colloidal silica can be used.

The surface modification of colloidal silica can be performed by, for example, chemically bonding a functional group of an organic acid to the surface of colloidal silica, that is, by immobilizing an organic acid. Alternatively, the surface modification of colloidal silica can be performed by mixing a metal such as aluminum, titanium, or zirconium, or oxides thereof with colloidal silica to dope the surface of the silica particles.

In the present embodiment, the colloidal silica contained in the polishing composition is, for example, colloidal silica having the surface on which an organic acid is immobilized. The colloidal silica having the surface on which an organic acid is immobilized tends to have a larger absolute value of a zeta potential in the polishing composition as compared to common colloidal silica on which an organic acid is not immobilized. Therefore, it is easy to adjust the zeta potential of the colloidal silica in the polishing composition in the range of −5 mV or less.

The zeta potential of the colloidal silica can be controlled in a desired range by using, for example, an acid, which will be described later, as a pH adjuster.

Examples of the colloidal silica having the surface on which an organic acid is immobilized include colloidal silica having the surface on which an organic acid such as a carboxylic acid group, a sulfonic acid group, a phosphonic acid group, and an aluminic acid group is immobilized. Among these, from the viewpoint of enabling easy production, colloidal silica having the surface on which a sulfonic acid or a carboxylic acid is immobilized is preferable, and colloidal silica having the surface on which a sulfonic acid is immobilized is more preferable.

Immobilization of an organic acid on the surface of colloidal silica is not achieved by merely allowing the organic acid to coexist with the colloidal silica. For example, immobilization of a sulfonic acid, which is a species of an organic acid, on colloidal silica can be performed by, for example, a method described in "Sulfonic acid-functionalized silica through of thiol groups", Chem. Commun. 246-247 (2003). Specifically, it is possible to obtain colloidal silica (sulfonic acid-modified colloidal silica) having the surface on which a sulfonic acid is immobilized by coupling a silane coupling agent having a thiol group, such as 3-mercaptopropyltrimethoxysilane, to colloidal silica, and thereafter oxidizing the thiol group with hydrogen peroxide.

Alternatively, the immobilization of a carboxylic acid, which is a species of an organic acid, on colloidal silica can be performed by, for example, a method described in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, it is possible to obtain colloidal silica (carboxylic acid-modified colloidal silica) having the surface on which a carboxylic acid is immobilized by coupling a silane coupling agent containing a photoreactive 2-nitrobenzyl ester to colloidal silica, and thereafter performing light irradiation.

(Average Primary Particle Size)

In the polishing composition of the present invention, the lower limit of the average primary particle size of the abrasives (for example, colloidal silica) is preferably 1 nm or more, more preferably 5 nm or more, and further preferably 10 nm or more. In addition, in the polishing composition of the present invention, the upper limit of the average primary particle size of the abrasives is preferably 100 nm or less, more preferably 70 nm or less, further preferably 50 nm or less, and particularly preferably 40 nm or less. In such a range, it is possible to reduce a defect such as a scratch that may be generated on the surface of an object to be polished after being polished using the polishing composition. The average primary particle size of the colloidal silica is calculated based on, for example, the specific surface area of the colloidal silica measured by a BET method.

(Average Secondary Particle Size)

In the polishing composition of the present invention, the lower limit of the average secondary particle size of the abrasives (for example, colloidal silica) is preferably 10 nm or more, more preferably 20 nm or more, further preferably 40 nm or more, and particularly preferably 50 nm or more. In addition, in the polishing composition of the present invention, the upper limit of the average secondary particle size of the abrasives is preferably 250 nm or less, more preferably 150 nm or less, further preferably 70 nm or less, and particularly preferably 40 nm or less. In such a range, it is possible to reduce a defect such as a scratch that may be generated on the surface of an object to be polished after being polished using the polishing composition.

In addition, secondary particles refer to particles formed by association of the abrasives (primary particles) in the polishing composition. The average secondary particle size of the abrasives can be measured by, for example, a dynamic light scattering method represented by a laser diffraction scattering method.

(Average Degree of Association)

The average degree of association of the abrasives (for example, colloidal silica) is preferably 5.0 or less, more preferably 4.0 or less, and further more preferably 3.0 or less. As the average degree of association of the abrasives decreases, it becomes easier to obtain a polished surface with few surface defects by polishing the object to be polished using the polishing composition. In addition, the average degree of association of the abrasives is preferably 1.0 or more, and more preferably 1.2 or more. As the average degree of association of the abrasives increases, there is an advantage that the removal rate of the object to be polished by the polishing composition is improved. The average degree of association of the abrasives is obtained by dividing the value of the average secondary particle size of the abrasives by the value of the average primary particle size.

(Shape)

In the present invention, the shape of the abrasives is not particularly limited and may be a spherical shape or a non-spherical shape of which the non-spherical shape is preferable. Specific examples of the non-spherical shape include, but are not particularly limited to, various shapes such as a polygonal column shape such as a triangular column and a quadrangular column, a cylindrical shape, a rice sack shape in which the central part of a cylinder swells more than the end part, a donut shape in which the central part of a disc penetrates, a tabular shape, a cocoon shape which has a constriction in the central part (in which two spheres joined to each other and this joint portion narrows like a constriction, for example), an associative spherical shape in which a plurality of particles is integrated, a confetti shape having a plurality of bumps on the surface, a rugby ball shape, a bead shape, and the like.

(Content)

The lower limit of the content of the abrasives is preferably 0.1% by mass or more, more preferably 0.3% by mass or more, and further preferably 0.5% by mass or more with respect to the content of the polishing composition. In addition, the upper limit of the content of the abrasives is preferably 20% by mass or less, more preferably 10% by mass or less, and further preferably 5% by mass or less with respect to the content of the polishing composition. In such a range, the polishing removal rate can be further improved. When the polishing composition contains two or more types of abrasives, the content of the abrasives means the total amount of these abrasives.

(Particles Other than Silica)

The polishing composition according to the present embodiment may contain, as particles, silica (for example, anion-modified colloidal silica) having a zeta potential of −5 mV or less), and abrasives other than silica. Alternatively, the polishing composition may contain abrasives other than silica having a zeta potential of −5 mV or less. Examples of the other abrasives include metal oxide particles such as alumina particles, zirconia particles, and titania particles.

<Liquid Medium>

The polishing composition according to the present embodiment may contain a liquid medium. The liquid medium functions as a dispersion medium or a solvent for dispersing or dissolving each component of the polishing composition (for example, additives such as anion-modified colloidal silica, a cationic surfactant, and a pH adjuster). Examples of the liquid medium include water and an organic solvent. One type can be used alone, or two or more types can be mixed and used, but the liquid medium preferably contains water. However, from the viewpoint of preventing the effect of each component from being inhibited, it is preferable to use water that contains as little impurities as possible. Specifically, pure water, ultrapure water, or distilled water from which impurity ions have been removed with an ion exchange resin and thereafter contaminants have been removed through a filter is preferable.

<pH Adjuster>

In the polishing composition according to the present embodiment, the pH value is preferably 6 or less, more preferably 5 or less, further preferably 4 or less, and particularly preferably 3 or less. In addition, the pH value is preferably 1 or more, more preferably 1.5 or more, and further preferably 1.7 or more. When the polishing composition is acidic, the polishing selectivity ratio of SiOC to silicon nitride can be increased (improved). The polishing composition may contain a pH adjuster to realize the above-mentioned pH value.

The pH value of the polishing composition can be adjusted by adding a pH adjuster. The pH adjuster used may be any of an acid or an alkali, and may be any of an inorganic compound and an organic compound.

Specific examples of the acid as the pH adjuster include an inorganic acid, and an organic acid such as a carboxylic acid or an organic sulfuric acid. Specific examples of the inorganic acid include sulfuric acid, nitric acid, boric acid, carbonic acid, hypophosphorous acid, phosphorus acid, phosphoric acid, and the like. As the pH adjuster, it is preferable to use an inorganic acid, among which a sulfuric acid-based, a nitric acid-based, or a phosphoric acid-based inorganic acid is preferable, and a nitric acid-based inorganic acid is more preferable. The organic acids include a carboxylic acid and an organic sulfuric acid. Specific examples of the carboxylic acid include formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, and the like. Furthermore, specific examples of the organic sulfuric acid include methanesulfonic acid, ethanesulfonic acid, and isethionic acid. For these acids, one type may be used alone, or two or more types may be used in combination. As the organic acid, a carboxylic acid-based organic acid or a phosphonic acid-based organic acid is preferably used. In addition, in the polishing composition, these acids may be contained as a pH adjuster, may be contained as an additive for improving a polishing removal rate, or may be a combination thereof.

Specific examples of the alkali as the pH adjuster include a hydroxide of an alkali metal or a salt thereof, a hydroxide of an alkaline earth metal or a salt thereof, ammonia, amines, and the like. Specific examples of the alkali metal include potassium, sodium, and the like. In addition, specific examples of the alkaline earth metal include calcium, strontium, and the like. Furthermore, specific examples of the salt include carbonates, hydrogen carbonates, sulfates, acetates, and the like.

Specific examples of the amines include methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, piperazine anhydrous, piperazine hexahydrate, 1-(2-aminoethyl)piperazine, N-methylpiperazine, guanidine, and the like.

For these alkalis, one type may be used alone, or two or more types may be used in combination. Among these alkalis, ammonia, ammonium salts, alkali metal hydroxides, alkali metal salts, and amines are preferable, and ammonia, potassium compounds, sodium hydroxide, ammonium hydrogen carbonate, ammonium carbonate, sodium hydrogen carbonate, and sodium carbonate are more preferable. In addition, the polishing composition further preferably contains a potassium compound as an alkali from the viewpoint of preventing metal pollution. Examples of the potassium compounds include a hydroxide of potassium or a potassium salt, and specific examples thereof include potassium hydroxide, potassium carbonate, potassium hydrogen carbonate, potassium sulfate, potassium acetate, potassium chloride, and the like.

<Surfactant>

The polishing composition according to the present embodiment contains the cationic surfactant. The cationic surfactant has an effect of imparting hydrophilicity to a polished surface of the object to be polished after polishing, and thus can improve the cleaning efficiency of the object to be polished after polishing and prevent the adhesion of dirt and the like.

Specific examples of the cationic surfactant include amine oxides, alkyltrimethylammonium salts, alkyldimethylammonium salts, alkylbenzyldimethylammonium salts, and alkylamine salts, among which amine oxides and dimethylamine oxides are preferable.

Specific examples of the amine oxides include N,N-dimethyldecylamine-N-oxide, N,N-dimethyldodecylamine-N-oxide, pyridine-N-oxide, N-methylmorpholine-N-oxide, coconut oil alkyl dimethylamine oxide, trimethylamine-N-oxide, dodecyl dimethylamine oxide, decyl dimethylamine oxide, and tetradecyl dimethylamine oxide, among which decyl dimethylamine oxide is preferable.

For these surfactants, one type may be used alone, or two or more types may be used in combination.

As the content of the surfactant in the entire polishing composition becomes larger, the cleaning efficiency of the object to be polished after polishing is further improved. Therefore, the content (concentration) of the surfactant in the entire polishing composition is preferably 0.001 g/L or more, more preferably 0.01 g/L or more, and further preferably 0.05 g/L or more.

In addition, as the content of the surfactant in the entire polishing composition becomes smaller, the amount of the surfactant remaining on the polished surface of the object to be polished after polishing is reduced, thereby further improving the cleaning efficiency. Therefore, the content of the surfactant in the entire polishing composition is preferably 10 g/L or less, more preferably 5.0 g/L or less, and further preferably 1.0 g/L or less.

<Phosphonic Acid-Based Chelating Agent>

The polishing composition according to the present embodiment contains the phosphonic acid-based chelating agent. The phosphonic acid-based chelating agent functions as a polishing prevention agent for silicon nitride. By adding the phosphonic acid-based chelating agent to the polishing composition, polishing of silicon nitride is prevented, which makes it possible to increase (improve) the polishing selectivity ratio of SiOC to silicon nitride.

Examples of the phosphonic acid-based chelating agent include ethylenediamine tetramethylenephosphonic acid (EDTMP), phytic acid, etidronic acid (HEDP), nitrilotris (methylene)phosphonic acid (NTMP), 2-phosphonobutane-1,2,4-tricarboxylic acid (PBTC), and the like.

The lower limit of the content of the phosphonic acid-based chelating agent in the entire polishing composition is not particularly limited because the effect is exhibited even in a small amount. However, as the content of the phosphonic acid-based chelating agent becomes larger, the polishing removal rate of carbon by the polishing composition is improved. For example, the content (concentration) of the phosphonic acid-based chelating agent in the entire polishing composition is preferably 0.01 g/L or more, more preferably 0.1 g/L or more, and further preferably 1 g/L or more.

In addition, as the content of the phosphonic acid-based chelating agent in the entire polishing composition becomes smaller, the object to be polished including carbon is less likely to be dissolved, thereby improving a step resolution property. Therefore, the content of the phosphonic acid-based chelating agent in the entire polishing composition is preferably 20 g/L or less, more preferably 10 g/L or less, and further preferably 5 g/L or less.

<Cationic Compound Having Molecular Weight of 300 or Less>

The polishing composition according to the present embodiment contains the cationic compound having a molecular weight of 300 or less as a selectivity improver for improving the polishing selectivity ratio of SiOC to silicon nitride. By adding the cationic compound having a molecular weight of 300 or less to the polishing composition, the polishing selectivity ratio of SiOC to silicon nitride can be increased (improved).

Examples of the cationic compound having a molecular weight of 300 or less include amines, quaternary ammonium cations, and the like. Amine is a general term for primary amines, secondary amines, and tertiary amines. The cationic compound having a molecular weight of 300 or less may contain an amine, may contain a quaternary ammonium cation, or may contain both an amine and a quaternary ammonium cation.

Specific examples of the amines include methylamine, dimethylamine, trimethylamine, ethylamine, diethylamine, triethylamine, ethylenediamine, monoethanolamine, N-($\beta$-aminoethyl)ethanolamine, hexamethylenediamine, diethylenetriamine, triethylenetetramine, piperazine anhydrous, piperazine hexahydrate, 1-(2-aminoethyl)piperazine, N-methylpiperazine, guanidine, and the like.

Specific examples of the quaternary ammonium cation include tetrabutylammonium hydroxide (TBAH), tetraethylammonium hydroxide (TEAH), tetramethylammonium hydroxide (TMAH), tetrachlorideammonium hydroxide (TPAH), and the like. As the quaternary ammonium cation, tetrabutylammonium hydroxide (TBAH) and tetraethylammonium hydroxide (TEAH) are preferable, and tetrabutylammonium hydroxide (TBAH) is more preferable.

For these cationic compounds having a molecular weight of 300 or less, one type may be used alone, or two or more types may be used in combination.

As the content of the cationic compound having a molecular weight of 300 or less becomes larger in the entire polishing composition, the selectivity can be improved. Therefore, the content (concentration) of the cationic compound having a molecular weight of 300 or less in the entire polishing composition is preferably 0.01 g/L or more, more preferably 0.05 g/L or more, and further preferably 0.1 g/L or more.

In addition, as the content of the cationic compound having a molecular weight of 300 or less becomes smaller in the entire polishing composition, coarse particles can be reduced. Therefore, the content (concentration) of the cationic compound having a molecular weight of 300 or less in the entire polishing composition is preferably 5 g/L or less, more preferably 3 g/L or less, and further preferably 1 g/L or less.

As an example, in the polishing composition according to the present embodiment, the content of the cationic compound is 0.15 g/L or more and 0.25 g/L or less.

<Water-Soluble Polymer>

The polishing composition according to the present embodiment may contain a water-soluble polymer. When the object to be polished includes polyvinyl, by adding the water-soluble polymer to the polishing composition, it is possible to adjust the polishing removal rate, that is, to increase or decrease the polishing removal rate.

Examples of the water-soluble polymer include polyvinyl alcohol (PVA), polyvinylpyrrolidone, polyethylene glycol (PEG), polypropylene glycol, polybutylene glycol, copolymers of oxyethylene (EO) and oxypropylene (PO), methyl cellulose, hydroxyethyl cellulose, dextrin, pullulan, and the like. For these water-soluble polymers, one type may be used alone, or two or more types may be used in combination. Among the water-soluble polymers, a nonionic polymer is preferable from the viewpoint of not interfering with the influence of the surfactant on the abrasives and a TEOS surface (not changing a zeta potential).

The water-soluble polymer is not limited to a nonionic polymer. The water-soluble polymer may be cationic or may be anionic. Examples of the cationic polymer include polyethyleneimine, polyvinylimidazole, polyallylamine, and the like. Examples of the anionic polymer include polyacrylic acid, carbonylmethyl cellulose, polyvinyl sulfonic acid, polyanetholesulfonic acid, polystyrene sulfonic acid, and the like.

<Oxidant>

The polishing composition according to the present embodiment may contain an oxidant. When the object to be polished includes silicon, for example, Poly-Si (polycrystalline silicon), the polishing removal rate can be adjusted by adding the oxidant to the polishing composition. That is, by selecting the type of oxidant to be added to the polishing composition, the polishing removal rate of Poly-Si can be increased or decreased. Specific examples of the oxidant include hydrogen peroxide, peracetic acid, percarbonate, urea hydrogen peroxide, perchloric acid, persulfate, and the like. Specific examples of the persulfate include sodium persucleate, potassium persulfate, ammonium persulfate, and the like. For these oxidants, one type may be used alone, or two or more types may be used in combination. Among these oxidants, persulfate and hydrogen peroxide are preferable, and hydrogen peroxide is particularly preferable.

As the content of the oxidant in the entire polishing composition becomes larger, the polishing removal rate of the object to be polished by the polishing composition is easily changed. Therefore, the content (concentration) of the oxidant in the entire polishing composition is preferably 0.01% by mass or more, more preferably 0.05% by mass or more, and further preferably 0.1% by mass or more. In addition, as the content of the oxidant in the entire polishing composition becomes smaller, the material cost of the polishing composition can be reduced. In addition, it is possible to reduce the load of disposal, that is, waste liquid disposal of the polishing composition after the use of polishing composition. Furthermore, excessive oxidation of the surface of the object to be polished by the oxidant is less likely to occur. Therefore, the content of the oxidant in the entire polishing composition is preferably 10% by mass or less, more preferably 5% by mass or less, and further preferably 3% by mass or less.

<Fungicide, Preservative>

The polishing composition may contain a fungicide and a preservative. Specific examples of the fungicide and the preservative include isothiazoline-based preservatives (for example, 2-methyl-4-isothiazolin-3-one and 5-chloro-2-methyl-4-isothiazolin-3-one), paraoxybenzoic acid esters, and phenoxyethanol. For these fungicides and preservatives, one type may be used alone, or two or more types may be used in combination.

<Production Method of Polishing Composition>

A production method of the polishing composition according to the present embodiment includes mixing the abrasives having a zeta potential of −5 mV or less, the cationic surfactant, the phosphonic acid-based chelating agent, the cationic compound having a molecular weight of 300 or less, and the liquid medium. For example, the polishing composition according to the present embodiment can be produced by stirring anion-modified colloidal silica as the abrasives, an amine oxide as the cationic surfactant, ethylenediamine tetramethylenephosphonic acid (EDTMP) or phytic acid as the phosphonic acid-based chelating agent, tetrabutylammonium hydroxide (TBAH) as the cationic compound having a molecular weight of 300 or less, and as necessary, various additives (for example, a pH adjuster, a water-soluble polymer, an oxidant, a fungicide, a preservative, or the like) in a liquid medium such as water to mix them. The temperature at the time of mixing is not particularly limited, but is preferably 10° C. or higher and 40° C. or lower, for example, and heating may be performed to improve a dissolution rate. In addition, the mixing time is not particularly limited.

<Object to be Polished>

In the polishing composition according to the present embodiment, the polishing selectivity ratio of SiOC to silicon nitride can be increased. Therefore, the object to be polished is preferably a SiOC film formed on a silicon nitride film, or a SiOC film formed on a semiconductor substrate or the like via a silicon nitride film. However, in the present embodiment, the type of the object to be polished is not limited to SiOC having silicon nitride as a base substrate. The type of the object to be polished may be SiOC having a base substrate other than silicon nitride. In addition, the type of the object to be polished may be elemental SiOC without a base substrate, an elemental compound containing SiOC, an elemental mixture containing SiOC, or the like.

In addition, the type of the object to be polished is not limited to a substance containing SiOC, and may be elemental silicon, a silicon compound other than a silicon nitride film, a metal, or the like. Examples of the elemental silicon include single crystal silicon, polysilicon, amorphous silicon, and the like. In addition, examples of the silicon compound include silicon dioxide, silicon carbide, and the like. The silicon dioxide may be a film formed by using tetraethoxysilane ((Si(OC$_2$H$_5$)$_4$)) (hereinafter, TEOS film). A silicon compound film includes a low permittivity film having a relative permittivity of 3 or less. Furthermore, examples of the metal include titanium, copper, aluminum, hafnium, cobalt, nickel, titanium, tantalum, gold, silver, platinum, palladium, rhodium, ruthenium, iridium, osmium, and the like. These metals may be contained in the form of an alloy or a metal compound.

<Polishing Method>

In the embodiment of the present disclosure, the SiOC-containing object to be polished is polished using the above-mentioned polishing composition. A configuration of a polishing device is not particularly limited, but for example, it is possible to use a common polishing device having a holder for holding a substrate or the like having an object to be polished, a driving unit such as a motor capable of changing the rotation rate, and a polishing platen to which a polishing pad (polishing pad) can be attached. As the polishing pad, it is possible to use nonwoven fabric, polyurethane, a porous fluororesin, and the like, which are common, without particular limitation. As the polishing pad, it is possible to use a polishing pad that has been subjected to groove processing to accumulate the polishing composition in a liquid state.

The polishing conditions are not particularly limited, but for example, the rotation rate of the polishing platen is preferably 10 rpm ($0.17\ s^{-1}$) or more and 500 rpm ($8.3\ s^{-1}$) or less. The pressure (polishing pressure) applied to the substrate having the object to be polished is preferably 0.5 psi (3.4 kPa) or more and 10 psi (68.9 kPa) or less. A supply method of the polishing composition to the polishing pad is also not particularly limited, and a method of continuously supplying by a pump or the like is employed. Although the supply amount is not limited, the surface of the polishing pad is preferably always covered with the polishing composition of one aspect of the present invention.

The polishing composition according to the present embodiment may be a one liquid type or may be a multiple liquid type including a two liquid type. In addition, the polishing composition may be prepared by diluting a liquid concentrate of the polishing composition with a diluent such as water, for example, 10-fold.

After the completion of polishing, the substrate is cleaned with running water, for example, and water droplets adhered to the substrate are wiped off and dried by a spin dryer or the like, thereby obtaining a substrate having a layer containing SiOC, for example. As described above, the polishing composition according to the present embodiment can be used for the application of polishing a substrate. A polished semiconductor substrate can be manufactured by polishing the surface of the object to be polished, such as SiOC, which is formed into a film on a semiconductor substrate (an example of a substrate) using the polishing composition according to the present embodiment. Examples of the semiconductor substrate include elemental silicon, a silicon compound such as a silicon nitride film, and a silicon wafer having a layer containing a metal or the like.

<Manufacturing Method of Semiconductor Substrate>

A manufacturing method of a semiconductor substrate according to the present embodiment includes polishing the surface of a semiconductor substrate (for example, SiOC formed into a film on the semiconductor substrate) using the above-mentioned polishing composition. A polishing method in the polishing is as described in the section of <Polishing method>, for example.

EXAMPLES

The present invention will be described in more detail with reference to the following examples and comparative examples. However, the scope of the art of the present invention is not limited to the following examples. Furthermore, various changes or enhancements can be added to the following examples, and the present invention may also include embodiments to which such changes or enhancements have been added.

<Adjustment Method of Polishing Composition>

Examples 1 to 3

As shown in Table 1 below, a mixed liquid was created by stirring and mixing abrasives having a zeta potential of −5 mV or less, a cationic surfactant, a phosphonic acid-based chelating agent, a cationic compound having a molecular weight of 300 or less, and water as a liquid medium. A pH adjuster was added to the created mixed liquid as necessary to produce polishing compositions of Examples 1 to 3. In addition, in Table 1, "−" indicates that this component was not used or there was no unit.

In Examples 1 to 3, sulfonic acid-modified colloidal silica, which is a species of anion-modified colloidal silica, was used as the abrasives. In Examples 1 to 3, the concentration of the sulfonic acid-modified colloidal silica in the polishing composition was 2% by mass. Hereinafter, % by mass will be written as wt %. In Examples 1 to 3, the sulfonic acid-modified colloidal silica had a primary particle size of 12 nm, a secondary particle size of 34 nm, and a zeta potential of −17 mV, −14 mV, or −20 mV.

In Examples 1 to 3, decyl dimethylamine oxide was used as the cationic surfactant. In Examples 1 to 3, the concentration of decyl dimethylamine oxide in the polishing compositions was 0.1 g/L.

In Examples 1 to 3, ethylenediamine tetramethylenephosphonic acid (EDTMP) was used as the phosphonic acid-based chelating agent. In Examples 1 to 3, the concentration of EDTMP in the polishing composition was 5 g/L.

In Examples 1 to 3, a pH adjustor was not added. However, EDTMP added as the phosphonic acid-based chelating agent functions as a pH adjuster for the polishing composition. In Examples 1 to 3, when the pH's of the polishing compositions (liquid temperature: 25° C.) were measured with a pH meter (product name: LAQUA (registered trademark) manufactured by HORIBA, Ltd.), the pH's were 2.0, respectively.

In Examples 1 and 2, tetrabutylammonium hydroxide (TBAH) was used as the cationic compound having a molecular weight of 300 or less. In Examples 1 and 2, the concentrations of TBAH in the polishing composition were 0.15 g/L and 0.25 g/L, respectively. In Example 3, tetraethylammonium hydroxide (TEAH) was used as the cationic compound having a molecular weight of 300 or less. In Example 3, the concentration of TEAH in the polishing composition was 0.25 g/L.

Comparative Examples 1 to 5

Each polishing composition was prepared in the same manner as in Examples 1 to 3 except that each component of the type and having the concentration shown in Table 1 was used.

TABLE 1

| | Abrasives in slurry | | | | | Surfactant | | Cationic |
| | Concentration % by mass | Primary particle size nm | Secondary particle size nm | ζ potential mV | Chelating agent Type | Type | Concentration g/L | compound Type |
|---|---|---|---|---|---|---|---|---|
| Ex. 1 | 2 | 12 | 34 | −17 | EDTMP | Decyl dimethylamine oxide | 0.1 | TBAH |
| Ex. 2 | 2 | 12 | 34 | −14 | EDTMP | Decyl dimethylamine oxide | 0.1 | TBAH |

TABLE 1-continued

| Ex. 3 | 2 | 12 | 34 | −20 | EDTMP | Decyl dimethylamine oxide | 0.1 | TEAH |
|---|---|---|---|---|---|---|---|---|
| Comp. Ex. 1 | 2 | 12 | 34 | −25 | EDTMP | Decy dimethylamine oxide | 0.1 | — |
| Comp. Ex. 2 | 2 | 12 | 34 | −25 | EDTMP | — | — | TBAH |
| Comp. Ex. 3 | 2 | 12 | 34 | 5 | EDTMP | Decyl dimethylamine oxide | 0.1 | — |
| Comp. Ex. 4 | 2 | 12 | 34 | −25 | EDTA | Decyl dimethylamine oxide | 0.1 | — |
| Comp. Ex. 5 | 2 | 12 | 34 | −25 | EDTMP | Decyl dimethylamine oxide | 0.1 | Hexadecyltri-methylammonium hydroxide |

| | Cationic | | pH | Physical property | Polishing removal rate | | Polishing selectivity SiOC/ silicon nitride | Processing |
|---|---|---|---|---|---|---|---|---|
| | compound Concentration g/L | | adjuster Component | pH [—] | SiOC [Å/min] | Silicon nitride [Å/min] | silicon nitride — | pressure [psi] |
| Ex. 1 | 0.15 | | — | 2.0 | 1560 | 52 | 30 | 2 |
| Ex. 2 | 0.25 | | — | 2.0 | 1576 | 50 | 32 | 2 |
| Ex. 3 | 0.25 | | — | 2.0 | 1520 | 60 | 25 | 2 |
| Comp. Ex. 1 | — | | — | 2.0 | 1489 | 76 | 20 | 2 |
| Comp. Ex. 2 | 0.15 | | — | 2.0 | 678 | 44 | 15 | 2 |
| Comp. Ex. 3 | — | | — | 2.0 | 42 | 45 | 1 | 2 |
| Comp. Ex. 4 | — | | — | 2.0 | 1489 | 388 | 4 | 2 |
| Comp. Ex. 5 | 0.15 | | — | 2.0 | 120 | 56 | 2 | 2 |

<Evaluation>

Using the polishing compositions of Examples 1 to 3 and Comparative Examples 1 to 5, a silicon wafer having a diameter of 300 mm was polished under the following polishing conditions.

Polishing device: F-REX300E, a single surface polishing device for 300 mm CMP manufactured by EBARA CORPORATION Polishing pad: IC1010, a rigid polyurethane pad manufactured by Nitta Haas Incorporated Polishing pressure: 2 psi (1 psi=6894.76 Pa)

Rotation speed of polishing platen: 107 rpm

Head rotation speed: 113 rpm Supply of polishing composition: in one way

Supply amount of polishing composition: 200 mL/minute

Polishing time: 60 seconds

The silicon wafers subjected to polishing were a 300 mm silicon wafer (thickness: 5,000 Å) with a SiOC film and a 300 mm silicon wafer (thickness: 3,500 Å) with a silicon nitride film. Using a light interference type film thickness measurement device (ASET-f5x: manufactured by KLA Corporation), each of the film thickness of the SiOC film before polishing and the film thickness of the SiOC film after polishing was measured. Similarly, using the light interference type film thickness measurement device, each of the film thickness of the silicon nitride film before polishing and the film thickness of the silicon nitride film after polishing was measured. Then, the polishing removal rates of the SiOC film and the silicon nitride film were calculated from a film thickness difference and a polishing time. The results of the polishing removal rates are shown in Table 1.

As shown in Table 1, it was confirmed that, in all of Examples 1 to 3, the polishing removal rate of the SiOC film with respect to the polishing removal rate of the silicon nitride film (in other words, the polishing selectivity ratio of SiOC to silicon nitride) was higher as compared to Comparative Examples 1 to 5. Hereinafter, the comparisons will be described in detail.

(Comparison of Examples 1 to 3 and Comparative Example 1)

Examples 1 to 3 and Comparative Example 1 were different from each other in whether or not the polishing composition contained the cationic compound (for example, TBAH or TEAH) having a molecular weight of 300 or less. The polishing compositions of Examples 1 to 3 contained TBAH or TEAH, whereas the polishing composition of Comparative Example 1 was free of TBAH or TEAH. Other points were the same in Examples 1 to 3 and Comparative Example 1. From Examples 1 to 3 and Comparative Example 1, it was confirmed that, when the cationic compound having a molecular weight of 300 or less was added to the polishing composition, the polishing selectivity ratio of SiOC to silicon nitride was increased (improved) as compared to the case of not adding this cationic compound.

(Comparison of Examples 1 to 3 and Comparative Example 2)

Examples 1 to 3 and Comparative Example 2 were different from each other in whether or not the polishing composition contained the cationic surfactant (for example, decyl dimethylamine oxide). The polishing compositions of Examples 1 to 3 contained decyl dimethylamine oxide, whereas the polishing composition of Comparative Example 2 was free of decyl dimethylamine oxide. Other points were the same in Examples 1 to 3 and Comparative Example 2. From Examples 1 to 3 and Comparative Example 2, it was confirmed that, when the cationic surfactant was added to the polishing composition, the polishing selectivity ratio of SiOC to silicon nitride was increased (improved) as compared to the case of not adding this cationic surfactant.

(Comparison of Comparative Examples 1 and 3)

Comparative Examples 1 and 3 were different from each other in whether or not the abrasives were anion-modified. In Comparative Example 1, the abrasives were anion-modified, whereas in Comparative Example 3, the abrasives were not anion-modified.

The zeta ($\zeta$) potential of the abrasives of Comparative Example 1 was $-25$ mV, and the zeta ($\zeta$) potential of the abrasives of Comparative Example 3 was 5 mV. Other points were the same in Comparative Examples 1 and 3. From Comparative Examples 1 and 3, it was confirmed that, when the zeta potential of the abrasives was high, the polishing removal rate of SiOC was decreased.

(Comparison of Comparative Examples 1 and 4)

Comparative Examples 1 and 4 were different from each other in whether the polishing composition contained the phosphonic acid-based chelating agent (for example, EDTMP) or contained a carboxylic acid chelating agent (for example, ethylenediaminetetraacetic acid (EDTA). The polishing composition of Comparative Example 1 contained EDTMP, whereas the polishing composition of Comparative Example 4 contained EDTA. Other points were the same in Comparative Examples 1 and 4. From Comparative Examples 1 and 4, it was confirmed that, when the phosphonic acid-based chelating agent was used, the polishing removal rate of silicon nitride was decreased. It was confirmed that the phosphonic acid-based chelating agent functioned as a polishing prevention agent for silicon nitride.

(Comparison of Examples 1 to 3 and Comparative Example 5)

Examples 1 to 3 and Comparative Example 5 were different from each other in whether or not the molecular weight of the cationic compound contained in the polishing composition was 300 or less. The polishing compositions of Examples 1 to 3 contained TBAH or TEAH having a molecular weight of 300 or less, whereas and the polishing composition of Comparative Example 5 contained hexadecyltrimethylammonium hydroxide having a molecular weight of more than 300. Other points were the same in Examples 1 to 3 and Comparative Example 5. From Examples 1 to 3 and Comparative Example 5, it was confirmed that, when the molecular weight of the cationic compound was more than 300, the polishing removal rate of SiOC was decreased.

The invention claimed is:

1. A polishing composition comprising:
abrasives having a zeta potential of $-5$ mV or less;
a cationic surfactant;
a phosphonic acid-based chelating agent; and
a cationic compound having a molecular weight of 300 or less.

2. The polishing composition according to claim 1, wherein the polishing composition contains the cationic compound as a selectivity improver for improving a polishing selectivity ratio of SiOC to silicon nitride.

3. The polishing composition according to claim 1, wherein a content of the cationic compound is 0.01 g/L or more and 5 g/L or less.

4. The polishing composition according to claim 1, wherein the cationic compound includes an amine.

5. The polishing composition according to claim 1, wherein the cationic compound includes a quaternary ammonium cation.

6. The polishing composition according to claim 1, wherein the cationic compound includes tetrabutylammonium hydroxide (TBAH) or tetraethylammonium hydroxide (TEAH).

7. The polishing composition according to claim 1, wherein a zeta potential of the abrasives is $-5$ mV or less and $-20$ mV or more.

8. The polishing composition according to claim 1, wherein the cationic surfactant includes an amine oxide.

9. The polishing composition according to claim 1, wherein the cationic surfactant includes a dimethylamine oxide.

10. The polishing composition according to claim 1, wherein the cationic surfactant includes a decyl dimethylamine oxide.

11. The polishing composition according to claim 1, wherein the phosphonic acid-based chelating agent includes ethylenediamine tetramethylenephosphonic acid (EDTMP).

12. The polishing composition according to claim 1, wherein a pH is 6 or less.

13. The polishing composition according to claim 1, wherein the abrasives include anion-modified silica.

14. The polishing composition according to claim 13, wherein the silica is silica having a surface on which an organic acid is immobilized.

15. The polishing composition according to claim 13, wherein the silica is colloidal silica.

16. The polishing composition according to claim 1, wherein the polishing composition is used for an application of polishing a SiOC-containing object to be polished.

17. A production method of the polishing composition according to claim 1, the production method comprising:
mixing abrasives having a zeta potential of $-5$ mV or less, a cationic surfactant, a phosphonic acid-based chelating agent, a cationic compound having a molecular weight of 300 or less, and a liquid medium.

18. A polishing method comprising:
polishing a SiOC-containing object to be polished by using the polishing composition according to claim 1.

19. A manufacturing method of a semiconductor substrate, the manufacturing method comprising:
polishing SiOC formed into a film on a semiconductor substrate by using the polishing composition according to claim 1.

20. The polishing composition according to claim 2, wherein a content of the cationic compound is 0.01 g/L or more and 5 g/L or less.

\* \* \* \* \*